(12) United States Patent
Kepler et al.

(10) Patent No.: US 10,008,702 B2
(45) Date of Patent: Jun. 26, 2018

(54) POUCH CELL

(71) Applicant: FARASIS ENERGY, INC., Hayward, CA (US)

(72) Inventors: Keith D. Kepler, Belmont, CA (US); Andrew W. Larson, Livermore, CA (US)

(73) Assignee: Farasis Energy, Inc., Hayward, CA (US)

( * ) Notice: Subject to any disclaimer, the term of this patent is extended or adjusted under 35 U.S.C. 154(b) by 70 days.

(21) Appl. No.: 15/161,155

(22) Filed: May 20, 2016

(65) Prior Publication Data

US 2016/0344004 A1 Nov. 24, 2016

Related U.S. Application Data

(60) Provisional application No. 62/164,219, filed on May 20, 2015.

(51) Int. Cl.
*H01M 2/12* (2006.01)
*H01M 2/02* (2006.01)
*H01M 10/0525* (2010.01)

(52) U.S. Cl.
CPC ....... *H01M 2/1223* (2013.01); *H01M 2/0275* (2013.01); *H01M 2/1282* (2013.01); *H01M 2/0207* (2013.01); *H01M 2/0217* (2013.01); *H01M 10/0525* (2013.01); *H01M 2200/20* (2013.01)

(58) Field of Classification Search
None
See application file for complete search history.

*Primary Examiner* — Yoshitoshi Takeuchi
(74) *Attorney, Agent, or Firm* — Womble Bond Dickinson (US) LLP

(57) ABSTRACT

The present invention relates to the field of battery cells, particularly to a pouch cell comprising a packaging seal, a heating element and a fault switch, wherein the fault switch will activate the heating element to generate heat to make the packaging seal delaminate when the inner space of the pouch cell reaches a predetermined pressure, such that the pouch cell vents. The mechanism and components of these venting concepts can be designed to be fully compatible with existing manufacturing methods and typical cell handling situations. The most favorable configuration has both vent device components outside the cell, with nothing passing through or even into the seal. Such a configuration has the advantage of having no impact on the seal integrity relative to a conventional pouch cell, is easy to manufacture, and has improved safety.

20 Claims, 5 Drawing Sheets

POUCH CELL

CROSS-REFERENCE TO RELATED APPLICATION

This application claims the benefit under 35 U.S.C. § 119(e) of U.S. Provisional Application No. 62/164,219, filed on May 20, 2015, entitled "Venting for Pouch Cells", which is specifically and entirely incorporated by reference.

FIELD OF THE INVENTION

The present invention relates to the field of battery cells, particularly to pouch cells.

BACKGROUND OF THE INVENTION

As Li-ion battery technology has improved, the use of Li-ion cells for consumer electronics applications has quadrupled over the past decade. The current annual market is approaching ~$10B. With the expected introduction of much larger Li-ion systems in applications such as hybrid electric vehicles (HEVs), plug-in hybrid electric vehicles (PHEVs) and power grid energy storage systems, the total market has the potential to see an order of magnitude increase over the next two decades. Currently there is a wide range of form factors for Li-ion cells. They can generally be categorized as cylindrical cells (cells that have a hard stainless steel case with a crimped or laser welded header), prismatic cells (flat cells with a hard case and laser welded header) and pouch cells (flat cells encased in thin, aluminum laminate packaging). Cylindrical cells are commonly found in computer and other portable electronics packs. Currently flat cells, including pouch cells, are more common in smaller consumer electronics applications such as cell phones. However, larger pouch cells are increasingly being adopted for use in high-end laptop computers and in tablets, in which the lightweight laminate packaged cells are closely integrated with the device to maximize device energy density and runtime. Even larger pouch cells are being used in the most popular EV applications to take advantage of the same higher energy density and good thermal characteristics the form factor offers. With demonstrated long life the Li-ion prismatic pouch cell is positioned to dominate these emerging markets.

While pouch cells have these advantages over hard case cells, they also pose unique problems that have proven very difficult to overcome. In particular, any gas generation in the cell causes it to expand like a balloon because these cells are contained in a soft laminate, heat sealed package. Li-ion chemistries are highly reactive and gas generation in a cell can occur under many situations. Initially, this expansion can damage the pack or device in which it resides or affect the thermal management of the system. And, because Li-ion chemistries are highly sensitive to exposure to air, and the seal quality and strength is necessarily exceptionally strong, the cell may fail explosively when the pouch finally bursts. To limit this problem, many of the advances in technology that have made pouch cells more widely accepted have involved preventing or mitigating gas generation under normal operating conditions. However, excessive gas generation due to cell packaging defects or under common abuse conditions that are inherent to Li-ion chemistries, has not been overcome. Thus, the risk of a cell ballooning and explosively venting flammable electrolyte in certain situations is a major concern for battery manufacturers, OEMs and their customers. Hard case cells address the issue of venting excess gas by incorporating rupture disks in the header, such that the cell vents once a certain pressure is exceeded. A similar mechanism for the controlled release of gas built up in pouch cells to prevent ballooning or an explosion and the risk of fire has yet to be developed. As a result, pouch cells have the potential to pose a safety risk particularly under abuse conditions. This has become an even greater concern as the pouch cells being developed have become so large and energy dense.

SUMMARY

To solve this problem, we claim a novel mechanism for venting Li-ion pouch cells that can be used with almost any pouch cell form factor. While the exact form of the venting device can vary, the general mechanism involves a fault activated heating element placed within or on top of the seal area such that the heat generated can cause the seal to delaminate. For most pouch cells this will typically be close to the sealing temperature of around 150° C. This heating element can be powered externally, or ideally by the battery itself.

Therefore, the present invention provides a pouch cell which comprises a packaging seal, a heating element and a fault switch, such as a pressure switch, wherein the pressure switch will activate the heating element to generate heat to make the packaging seal delaminate when the inner space of the pouch cell reach a predetermined pressure, such that the pouch cell vents.

The mechanism and components of these venting concepts can be designed to be fully compatible with existing manufacturing methods and typical cell handling situations. The most favorable configuration has both vent device components outside the cell, with nothing passing through or even into the seal. Such a configuration has the advantage of having no impact on the seal integrity relative to a conventional pouch cell, is easy to manufacture, and has improved safety. After venting of excess pressure has occurred, and before the seal area has cooled, application of back pressure to the vent area could be used to reseal the pouch cell.

Other features and advantages of the present invention will be explained specifically in the following detailed description of the embodiments.

BRIEF DESCRIPTION OF THE DRAWINGS

FIG. 1 shows a typical schematic of a typical Li-ion pouch cell, wherein FIG. 1a is a top view and FIG. 1b is a side view.

BRIEF DESCRIPTION OF THE REFERENCE SIGNS

1: packaging seal; 2: cell cup; 3: electrode jellyroll; 4: tab; 5: pressure switch; 6: heating element; 7: conductive wire; 8: concave dimple; 9: conductive material; 10: void area; 11: point seals; 12: cell frame; 13: first conductive material; 14: second conductive material; 15: pressure device.

DETAILED DESCRIPTION OF THE EMBODIMENTS

Hereunder the embodiments of the present invention will be specified in details. It should be appreciated that the embodiments described here are only provided to describe and explain the present invention, but shall not be deemed as constituting any limitation to the present invention.

The present invention provides a pouch cell which comprises a packaging seal, a heating element and a fault switch, wherein the fault switch will activate the heating element to generate heat to make the packaging seal delaminate when the inner space of the pouch cell reaches a predetermined pressure, such that the pouch cell vents.

In the present invention the fault switch may be a pressure switch, an electronic switch in a battery management system, a temperature switch or some other triggering mechanism or combination of mechanisms that are capable of activating the heating element In the present invention, the pouch cell may be a conventional pouch cell in the art as long as it possesses a venting problem, particularly preferred to as a Li-ion pouch cell.

Figure 1:
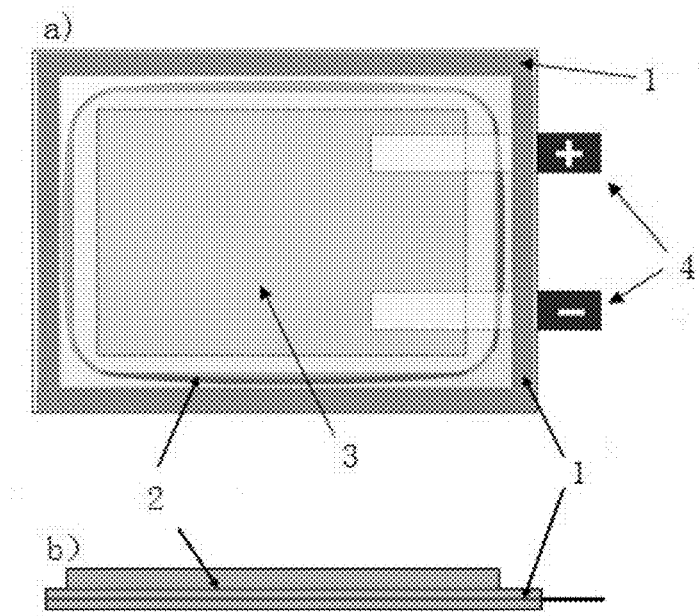

A general schematic of the top view (FIG. 1a) and side view (FIG. 1b) of a typical Li-ion pouch cell is shown in FIG. 1. As shown in FIG. 1, one or both sides of the packaging material is pre-formed into a cup "herein referred as cell cup 2", into which the electrode jellyroll 3 (or electrode stack) can be placed. The cell is generally sealed on three sides (including the tab side) and filled with electrolyte before a final vacuum seal finishes the process such that the packaging seal 1 is obtained. Depending on the Li-ion technology, the electrode hot lamination or polymerization process, if any, is often done after the cell is sealed, prior to formation. To ensure long life, the seal around the cell is critical. Handling anything passing through the seal, such as the tabs 4, is the most difficult aspect of manufacturing these types of cells. Typically the tabs come with a pre-applied polymer layer positioned at the point they will pass through the seal. The pre-applied polymer layer ensures that no gaps form as the pouch is sealed around the tabs and the layer provides strong adhesion between the tab material (Ni or Al) and the aluminum laminate packaging at the tab seal side. This sealing technology, developed and optimized over many years, has successfully allowed the widespread commercialization pouch cells.

Generally, the outer case of a Li-ion pouch cell is made from a thin flexible aluminum laminate material. Unlike metal casings, the pouch cell casing is not capable of providing stack pressure to the electrode stack or jellyroll. The laminate is Aluminum foil coated on the outside with a polymer layer or layers that provide mechanical strength to the sheet, and on the inside with a polymer layer or layers that can be sealed using a heat sealer. It is typically about 100 µm to about 150 µm thick depending on the amount/thickness of polymer used for sealing. Usually the package is sealed by placing the top and bottom laminate sheets facing each other between two heated bars that are compressed together at a predetermined pressure, temperature (ex. about 180° C. to 200° C.) and time (ex. 2-6 sec) based on the specific sealing layers, sealing dimensions, and thermal mass of the laminate material. The actual melting/delamination temperature of the sealing polymer layers, which are typically polyethylene or polypropylene, ranges from 120° C. to 160° C. Because the packaging must protect the cell for years from water and air ingress, the seal width, quality and uniformity is critical.

In a Li-ion cell the cathode is typically a lithium metal oxide such as $LiCoO_2$ and the anode is typically graphite, which can reversibly intercalate lithium ions to form $LiC_6$. $LiC_6$ is highly reactive, with a voltage only slightly above that of Lithium metal. When a Li-ion cell is first charged after being assembled, the electrolyte will reduce at the surface of the anode, generating some gaseous products, but also forming a stabilizing layer (Surface-Electrolyte-Interface, SEI layer) that limits any further reactions of the electrolyte. Gas generating reactions at the cathode are generally avoided by limiting the voltage such that the cathode material does not become too oxidized and unstable. By controlling the chemistry of the electrolyte, the SEI layer can be engineered such that after the first formation cycle, there is almost no additional gas generation in a Li-ion cell during normal operation. However, under abuse conditions, the Li-ion cell is pushed outside this realm of stability and a large amount of heat and gas can be generated by the highly reactive electrode materials.

Abuse conditions for Li-ion cells include a number of situations. For example, overcharging the cell beyond its maximum voltage (typically about 4.2V), heating the cell above a set temperature (about 80° C.-100° C.), particularly at high states of charge, or shorting the cell which consequently generates a large excess of heat very rapidly, can all cause a Li-ion cell to fail in a catastrophic manner. As a lithium ion cell is heated to higher and higher temperatures, the SEI layer on the anode will eventually degrade accelerating heat and gas generating reactions between the electrode and electrolyte. At high states of charge, these reactions can generate enough heat to eventually trigger the decomposition of the highly charged lithium metal oxide cathode, liberating oxygen. Unless this escalating thermal runaway process is interrupted the cell will eventually build up enough gas pressure that it will fail either by venting without flame in the best case, or in the worst case, explode with the electrolyte and cell on fire. Because of this, controlled venting of failing Li-ion cells is a critical safety issue.

Figure 2:
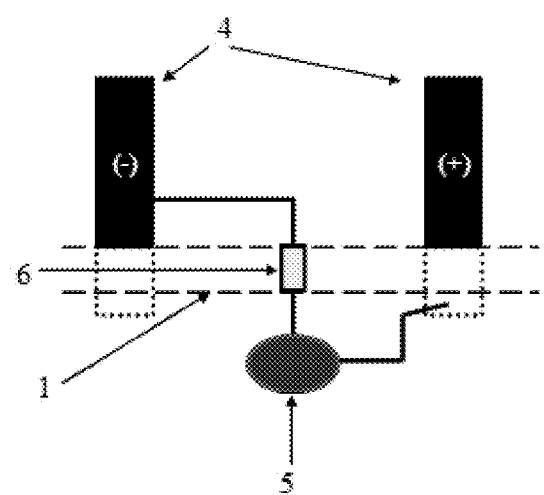
FIG. 2 shows a general schematic of the pouch cell according to a embodiment of the present invention.

Herein, the present invention provides a pouch cell which can vent once a certain internal cell pressure is exceeded. FIG. 2 shows a general schematic of the pouch cell according to an embodiment of the present invention, which exhibits the key elements for venting in Li-ion pouch cells. The two key elements in this embodiment are a reversible pressure switch 5 that will connect the anode and cathode tabs once a certain internal cell pressure is exceeded, and a heating element 6 that uses the energy from the cell or battery to heat up sufficiently to delaminate the seal around the heating element, opening a pathway for gas release.

A unique aspect of the mechanism according to the present invention is the use of energy from the cell or battery to provide sufficient power to the heating element such that the seal will delaminate. A shorted Li-ion cell will usually discharge at above 2 C rate for at least a number of seconds and often will reach significantly higher rates if the resistance is low enough. For a 5 Ah cell this corresponds to about 36 W. For a 20 Ah cell it would be 4 fold that, or a huge 144 W that is available to power the heat element. As described above the packaging seal typically comprises two polypropylene or polyethylene layers that have been bonded together by the application of heat and pressure. The melting point of these polymers ranges from about 100° C. to 160° C. Thus the heat element needs to reach that melting point or higher such as about 200° C. to sufficiently weaken the surrounding seal area so that it will delaminate, or be pulled apart under pressure. In the present invention, a simple calculation is used to estimate the energy required to generate sufficient heat for delamination using the equation:

$$\Delta Et = m \cdot C \cdot \Delta T$$

Assuming a specific heat for the polymer material at about 1 J/kgK (C), a polymer mass (m) of about 1 g, a temperature change (ΔT) of about 200° C. (from 0° C. to 200° C.), only about 0.2 J of energy is required. Assuming a cell voltage of about 3.4 V, and a timescale of about 1 second, this corresponds to about 0.2 W of power. With a circuit resistance of about 60 Ohms, the current required is only about 60 mA. This corresponds to about 1.6 W/cm$^2$ for a heating element that is as large as 0.13 cm$^2$, which can be handled by many common heating devices. This small amount of power required to heat the seal interface to a delaminating temperature such as about 200° C. can be readily supplied by most Li-ion cells.

Heating Element:

A preferable heating element in a preferred embodiment of the present invention should have one or more of the following characteristics:
1. It should heat rapidly to the desired temperature and heat the seal area rapidly to a sufficiently high temperature to delaminate.
2. It should have the capability to cause venting within a consistently narrow time span after the pressure trigger has been activated.
3. It should minimize any risk of ignition of fire of any cell or battery component.
4. It is preferred that it be placed completely external to the seal.
5. The design should have the capability to be adapted to different cell form factors and thermal masses.
6. The device should have the capability to be adapted to vent within different time periods after being triggered.
7. It should be easy to add to a cell with high reliability and yield.
8. It should be low cost.
9. It should have the potential to enable resealing of the cell seal after the vent.

That means the heating element may be disposed between the two layers of the packaging seal or on the top of the packaging seal outside the pouch cell, preferably the heating element is disposed on the top of the packaging seal outside the pouch cell (that is placing the heating element on top of the seal area external to the cell in contact with the outer layer of the packaging seal), in this case there may be a major positive impact on the design and commercial feasibility of the present invention since it greatly simplifies the manufacturing processes required to apply the venting components (including the heating elements and the fault switch) to a conventional Li-ion cell. Most preferably, the heating element is disposed on the top of the packaging seal at the tab side (that is placing the heating element on top of the tab seal side in contact with the outer layer of the packaging seal).

In the present invention, the heating element may be any heater as long as it could obtain the above effect, preferably the heating element is a NiChrome wire or a Kapton heater. Regarding to the adhesion between the package material and the heating element, NiChrome wire (such as having a diameter of about 0.07 mm to 0.3 mm) is more preferred.

The configuration of the NiChrome wire as a heating element may be variable. Regarding to disposition between the two layers of the packaging seal, the preferred configuration of the NiChrome wire is a single bend or more bends of the wire passing a little over halfway (ex. a little over half bend) into the seal but not all the way through it such that to ensure the hermeticity. Regarding to disposition on top of the packaging seal, the preferred configuration of the NiChrome wire is a single bend or more bends of the wire taped or attached on the surface of the seal area.

As described above, the heating element according to the present invention can generate heat including via an external power source or via the pouch cell or battery itself to delaminate the packaging seal to vent the pouch cell, it is preferred to make the heating element generate heat via the pouch cell itself. In this case, shown in FIG. 2, the heating element 6, the fault switch (preferably is a pressure switch 5) and two tabs 4 of the pouch cell will be electronically connected to form a closed circuit such that the heating element will generate heat to make the packaging seal 1 delaminate by shorting the pouch cell when the inner space of the pouch cell reach a predetermined pressure.

In an embodiment of the invention the heating element is activated by a fault switch which may be a pressure switch, an electronic switch in a battery management system, a temperature switch or some other triggering mechanism or combination of mechanisms that are capable of activating the heating element.

A preferred embodiment of the invention is the fault switch is a pressure switch.

Pressure Switch:

A preferable pressure switch in a preferred embodiment of the present invention should have one or more of the following characteristics:
1. It should be reversible so that once the cell has vented it will prevent continued discharge of the cell through the heating element.
2. It should activate rapidly within a narrow pressure range.
3. The design should have the capability to be adapted to respond at different pressures
4. The design should have the capability to be adapted to different cell form factors.
5. It should be protected from accidental triggering.
6. It should be easy to attach to a cell with high yield and reliability.
7. It should be very low cost.

As described above, the pressure switch of the present invention is triggered by excessive pressure in the cell, then the triggered pressure switch will activate the heating element to generate heat to make the packaging seal delaminate. In a preferred embodiment, the above mentioned circuit will close by triggering the pressure switch to short the pouch cell such that the pouch cell itself plays a role as the power source of the heating element to generate heat.

In general, the promising present concepts for the pressure switch rely on utilizing a change in the packaging shape caused by pressure build up within the cell.

Figure 3:
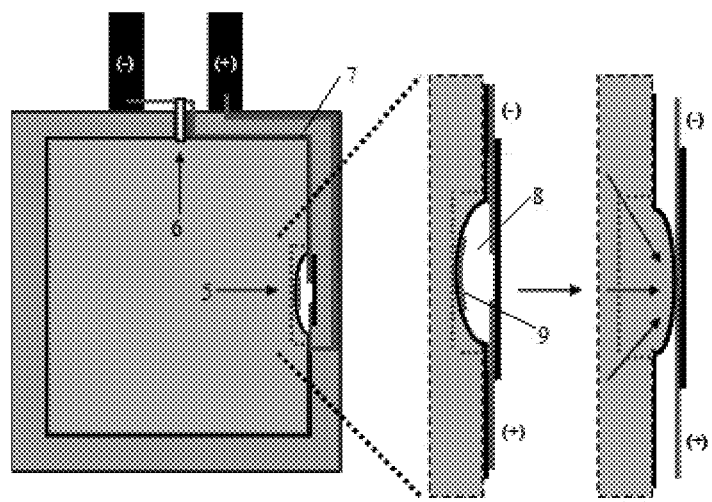
FIG. 3 shows a general schematic of the pouch cell according to another embodiment of the present invention.

In a preferred embodiment according to the present invention, as shown in FIG. 3, the pressure switch 5 comprises:
a concave dimple 8 formed into the side of the packaging seal,
a conductive material 9 coated in the concave dimple 8, and
two conductive wires 7 connected to the heating element and one tab of the pouch cell respectively and without contacting with each other at the concave dimple 8; wherein
when the inner space of the pouch cell reaches a predetermined pressure, the concave dimple 8 will be caused to invert outwards so that the conductive material 9 coated in the concave dimple will contact with the conductive wire 7 to bridge the circuit (that is the closed circuit for shorting the cell).

The above mentioned pressure switch also may be referred to as a dimple pressure switch. The concave dimple 8 may be formed in any method as long as there could form a concave space in the packaging of the pouch cell to enable a conductive material 9 to be coated in and enable the pressure built up inside the cell trigger the pressure switch to bridge the above mentioned circuit, for example, the dimple could be formed by simply pressing in on the packaging from outside the cell with a rounded tool. The conductive material and the conductive wires could be any conductive material, such as Cu foil.

In another preferred embodiment according to the present invention, the pressure switch comprises:
a spring, and
two conductive wires,
wherein the spring is disposed between the two conductive wires, the two conductive wires are connected to the heating element and one tab of the pouch cell respectively and without contacting with each other at the spring;
when the inner space of the pouch cell reach a predetermined pressure, the spring will be fully compressed to close the circuit, and once the venting accomplished, the spring will push apart the two conductive wires.

In this case, the spring would provide resistance to the pressure being applied by the ballooning pouch cell until the spring is fully compressed and the circuit is closed. Once the cell vents the same spring would provide a mechanism to ensure that the circuit is disconnected by pushing apart the conductive wires once the force from the ballooning pouch cell decreased.

Figure 7:
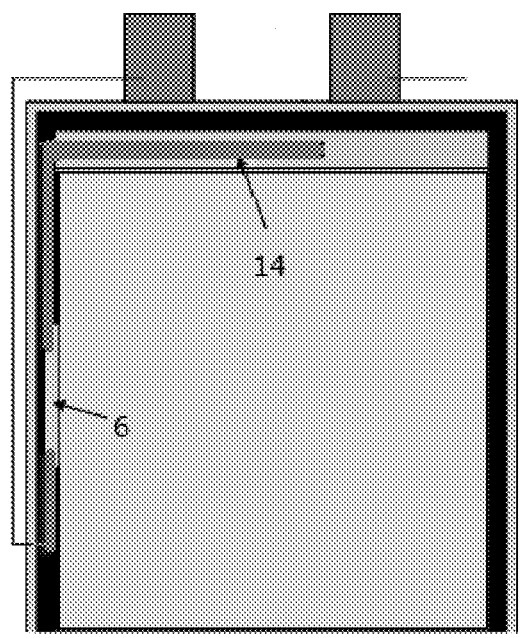
FIG. 7 shows a general schematic of the pouch cell according to another embodiment of the present invention.
Figure 8:
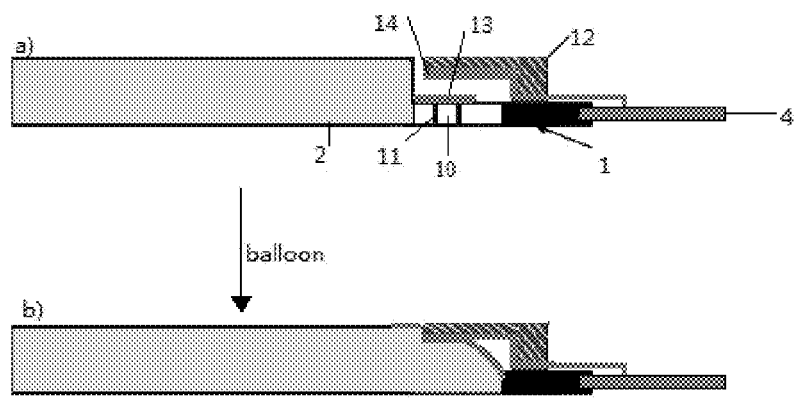
FIG. 8 shows a general schematic of the pouch cell according to another embodiment of the present invention.

In a specially preferred embodiment according to the present invention, as shown in FIG. 7 and FIG. 8, the pouch cell further comprises a cell frame 12 in which is placed a pouch cell, and the pressure switch comprises
a void area 10 presented between the outer edge of a cell cup 2 and the inner edge of the packaging seal 1,
optional point seals 11 applied at the void area 10,
a first conductive material 13 disposed on the outside region of the void area, and
a second conductive material 14 attached to the cell frame 12,
wherein the first conductive material 13 is opposite to the second conductive material 14 and there is a void space between them, the first conductive material 13 is connected to the heating element 6,
and the heating element 6 and the second conductive material 14 are connected to one of the tabs 4 of the pouch cell respectively;
when the inner space of the pouch cell reach a predetermined pressure, the cell cup 2 will balloon to make the first conductive material 13 contact with the second conductive material 14 to bridge the circuit;
once the venting is accomplished, the circuit will open by separating the first conductive material 13 and the second conductive material 14.

Figure 4:
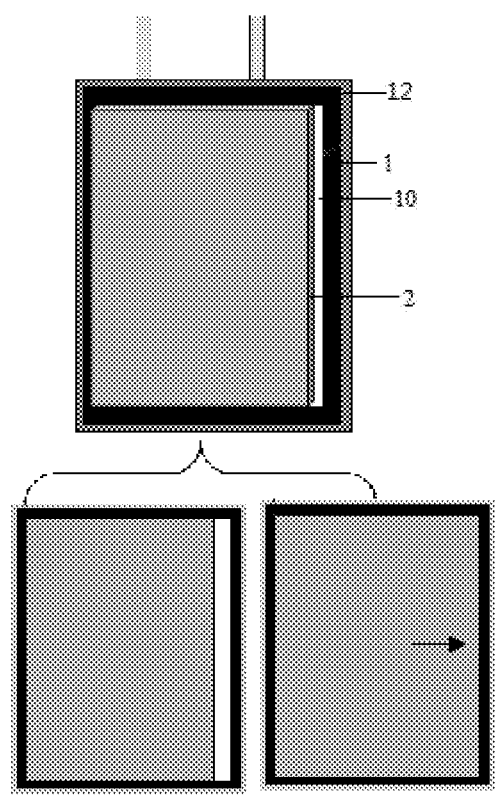
FIG. 4 shows a simple illustration of the ballooning concept.

In the above embodiment, the concept (herein referred as ballooning concept) is to allow the packaging to expand in a controlled manner such that it can activate a switch. FIG. 4 shows a simple illustration of the ballooning concept. The packaging seal 1 is placed all along the edge of the cup (in practice this is not practical on the tab side). A frame 12 is placed around the preformed cup 2 on top of the seal (this is a common configuration for prismatic pouch cells stacked in a Li-ion battery pack), it is noted that the seal on one side is moved away from the cup edge slightly, there is now an empty void area 10 within the cell. Once pressurized the empty void area 10 balloons outwards pushing the cup edge against the frame. In a real pouch cell, the tab side has such an open space, which will be the first region to balloon when a confined cell is pressurized, so preferably the void area is a void area between the cell cup and the tab side seal.

Figure 5:
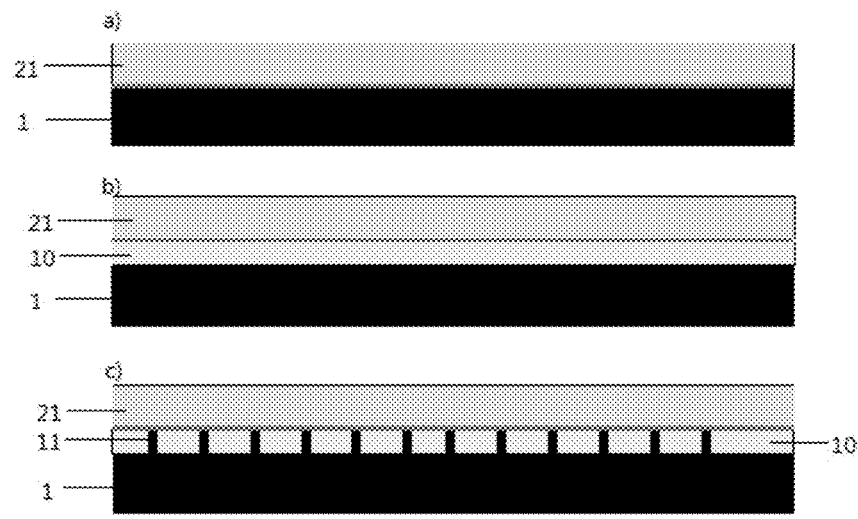
FIG. 5 shows a simple illustration of point seals formed inside the pouch seal.

In order to control the pressure at which the pouch cell would begin ballooning or would have sufficient force to close the circuit, preferably point seals 11 are applied at the void area 10 shown as FIG. 5c. In FIG. 5a, there is no void area between the outer edge 21 of a cell cup and the packaging seal 1 while in FIG. 5b, a void area 10 is formed between the outer edge 21 of a cell cup and the packaging seal 1 and through this, the ballooning concept can be used, and FIG. 5c further shows how the point seals is applied. Through the applied point seals, the resistance of the pouch cell expansion may be increased, but the applied point seals would pull apart at a reasonable pressure to allow the pouch to expand and close the switch.

Figure 6:
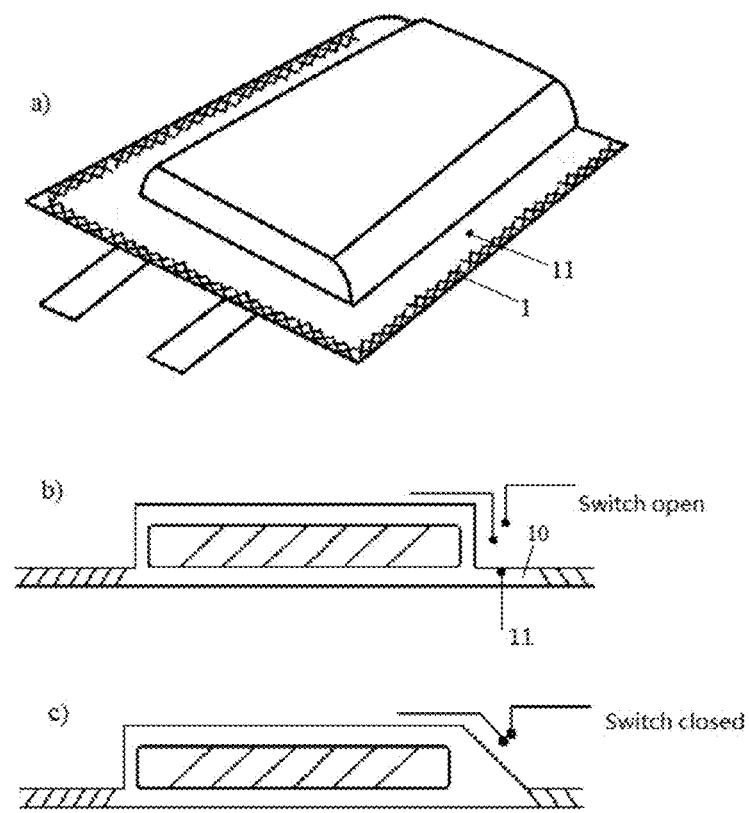
FIG. 6 shows an illustration of a modified pressure switch mechanism with point seals.

According to the present invention, FIG. 6 shows an illustration of a modified pressure switch mechanism with point seals 11 disposed in the void area between the cell cup and the packaging seal 1, wherein FIG. 6a shows a side view illustration of this embodiment, and FIG. 6b shows the circuit is open when the point seals 11 present, then the circuit is closed when the point seals break by ballooning of the cell or battery shown as FIG. 6c.

In the above preferred embodiment, the first conductive material and second conductive material could be any conductive material, such as Cu foil. As shown in FIG. 7 and FIG. 8, the first conductive material 13 and second conductive material 14 are layed oppositely without connection but can be pushed to contact with each other when the cell balloon to a certain level. Wherein, the first conductive material 13 is connected with the heating element 6 and one tab sequentially (that is the first conductive material 13—the heating element 6—one tab), while the second conductive material 14 is attached to the cell frame with connection to the other tab, when the first conductive material 13 is pushed to contact with the second conductive material 14 by the ballooning pouch cell, the circuit will be closed by the electronically conductive connection of the first conductive material 13, the second conductive material 14, the heating element 6, and the two tabs 4, then the heating element 6 will generate heat to heat to make the packaging seal (referred to the seal area where the heating element 6 laid on) delaminate by shorting the pouch cell due to the closed circuit, therefore the pouch cell vents, and once the venting accomplished, the circuit will open spontaneously by separating of the first conductive material 13 and the second conductive material 14 (should be a spontaneously separating process).

Figure 9:
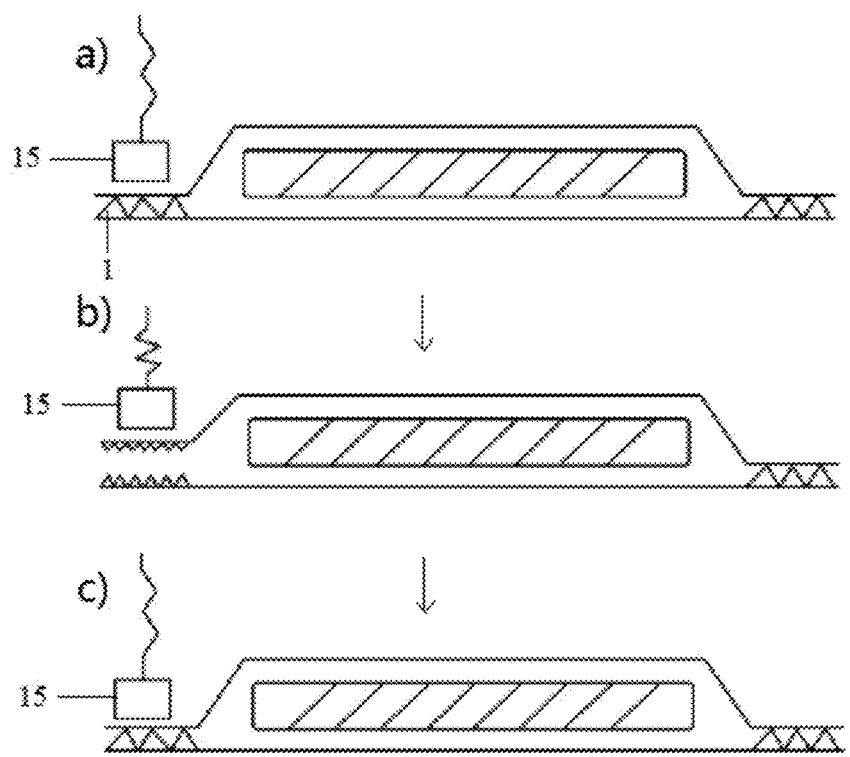
FIG. 9 shows an illustration of the pressure device which can reseal the vented pouch cell.

Preferably the pouch cell further comprises a pressure device which will apply pressure to the seal side of venting to reseal it once the venting is accomplished and the circuit is open. The resealing concept is to apply back pressure to the seal area such that when the cell vents and the heater turns off, then the pressure device quickly press the two, still hot, sides of the pouch cell together so that they may reseal as the binding polymer layers cool just as they do when using a heat sealer. FIG. 9 shows an illustration of the pressure device which can reseal the vented pouch cell, wherein a pressure device 15 is applied in the region at or near where the vent is created by the heating element. In FIG. 9a, a spring of the pressure device 15 keeps releasing before venting, then it is compressed by the force of internal pressure of the cell during ballooning shown as FIG. 9b and at last the spring of the pressure device 15 will release to revert the force to reseal the venting seal region once venting is completed as shown in FIG. 9c.

Below the present invention is described in detail by referring to embodiments.

EXAMPLE 1

This example is intended to illustrate the pouch cell of the present invention.

As shown in FIG. 7 and FIG. 8, an about 2 Ah Li-ion pouch cell is assembled, wherein a NiChrome wire of about 1 cm length and about 0.1 mm diameter is used as the heating element and is placed on top of the seal, external to the pouch cell, on the left side of the cell. The natural void area between the jellyroll and the tab side seal is utilized as the ballooning part of the pouch cell to act as the pressure trigger. A piece of Cu foil is placed on and across this region such that it is aligned with another piece of Cu foil attached to the frame that would hold the cell. The positive tab is connected by wire to the piece of Cu foil on the frame, opposite the piece of Cu foil applied to the cell. The Cu foil on the pouch cell pass around the edge of the cup and is attached to the NiChrome wire. The other side of the NiChrome wire is attached by wire to the negative terminal of the cell. In addition, two additional point seals with weak adhesion are applied at the void area by using soldering iron.

To simulate a pouch cell with excessive gas generation the pouch cell is pressurized by pumping air into it from a compressed gas cylinder. When the inner pressure reached 10 psi, the cell rapidly balloons, push apart the point seals, activates the pressure trigger, the circuit is closed to make NiChrome wire generate heat, and finally the cell vents within about 5 seconds.

The described and illustrated embodiments are to be considered as illustrative and not restrictive in character, it being understood that only the specific embodiments according to the invention have been shown and described and that all changes and modifications that come within the scope of the invention, as set out in the accompanying claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "one" are used to preface a feature there is no intention to limit the claim to only one such feature unless specifically stated to the contrary in the claim.

Above the preferred embodiments of the present invention are described in details, but the present invention is not limited to the concrete details of the foregoing embodiments. Within the scope of the technical conception of the present invention, the technical scheme of the present invention may have various simple modifications. They all shall be within the scope of protection of the present invention.

Besides, it should be noted that the concrete technical features described in the foregoing embodiments may be combined in any appropriate way under the condition of no conflict. In order to avoid unnecessary repetition, all the possible combinations of the present invention are not described separately.

Further, the embodiments of the present invention may be freely combined provided that such combinations won't go against the thinking of the present invention. Likewise, they should also be deemed as the content disclosed by the present invention.

What is claimed is:

1. A pouch cell, comprising a packaging seal, a heating element and a fault switch, wherein the fault switch will activate the heating element to generate heat to make the packaging seal delaminate when the inner space of the pouch cell reaches a predetermined pressure, such that the pouch cell vents.

2. The pouch cell according to claim 1, wherein the heating element is disposed between the two layers of the packaging seal or on top of the packaging seal outside the pouch cell.

3. The pouch cell according to claim 2, wherein the heating element is disposed on top of the packaging seal at tab side.

4. The pouch cell according to claim 2, wherein the heating element is a NiChrome wire or a polyimide-film insulated flexible heater.

5. The pouch cell of claim 1, wherein the fault switch capable of activating the heating element is at least one of the following; a pressure switch, an electronic switch in a battery management system, or a temperature switch.

6. The pouch cell according to claim 5, wherein the heating element is a NiChrome wire or a polyimide-film insulated flexible heater.

7. The pouch cell according to claim 1, wherein the fault switch is a pressure switch, and the pressure switch, the heating element and two tabs of the pouch cell will be electronically connected to form a closed circuit such that the heating element will generate heat to make the packaging seal delaminate by shorting the pouch cell when the inner space of the pouch cell reaches a predetermined pressure.

8. The pouch cell according to claim 7, wherein the pressure switch comprises:
   a concave dimple formed into the side of the packaging seal,
   a conductive material coated in the concave dimple, and
   two conductive wires connected to the heating element and one tab of the pouch cell respectively and without contacting with each other at the concave dimple; wherein
   when the inner space of the pouch cell reach a predetermined pressure, the concave dimple will be caused to invert outwards so that the conductive material coated in the concave dimple will contact with the conductive wire to bridge the circuit.

9. The pouch cell according to claim 8, wherein the heating element is a NiChrome wire or a Kapton heater.

10. The pouch cell according to claim 8, wherein the heating element is disposed between the two layers of the packaging seal or on top of the packaging seal outside the pouch cell.

11. The pouch cell according to claim 7, wherein the heating element is disposed between the two layers of the packaging seal or on top of the packaging seal outside the pouch cell.

12. The pouch cell according to claim 7, wherein the pressure switch comprises:
   a spring, and
   two conductive wires,
   wherein the spring is disposed between the two conductive wires, the two conductive wires are connected to the heating element and one tab of the pouch cell respectively and without contacting with each other at the spring;

when the inner space of the pouch cell reach a predetermined pressure, the spring will be fully compressed to close the circuit, and once the venting accomplished, the spring will push apart the two conductive wires.

13. The pouch cell according to claim 12, wherein the heating element is a NiChrome wire or a Kapton heater.

14. The pouch cell according to claim 12, wherein the heating element is disposed between the two layers of the packaging seal or on top of the packaging seal outside the pouch cell.

15. The pouch cell according to claim 7, wherein the pouch cell further comprises a cell frame in which is placed a pouch cell, and the pressure switch comprises:
 a void area presented between the outer edge of a cell cup and the inner edge of the packaging seal,
 optional point seals applied at the void area,
 a first conductive material disposed on the outside region of the void area, and
 a second conductive material attached to the cell frame,
 wherein the first conductive material is opposite to the second conductive material and there is a void space between them, the first conductive material is connected to the heating element, and the heating element and the second conductive material are connected to one of the tabs of the pouch cell respectively;

when the inner space of the pouch cell reach a predetermined pressure, the cell cup will balloon to make the first conductive material contact with the second conductive material to bridge the circuit;

once the venting accomplished, the circuit will open spontaneously by separating of the first conductive material and the second conductive material.

16. The pouch cell according to claim 15, wherein the pressure switch comprises point seals applied at the void area, when the inner space of the pouch cell reach a predetermined pressure, the cell cup will balloon to pull the point seals apart and make the first conductive material contact with the second conductive material to bridge the circuit.

17. The pouch cell according to claim 15, wherein the void area is a void area between the cell cup and the tab side seal.

18. The pouch cell according to claim 7, wherein the pouch cell further comprises a pressure device which will apply a pressure to the seal side of venting to reseal it once the venting accomplished and the circuit open.

19. The pouch cell according to claim 1, wherein the heating element is a NiChrome wire or a polyimide-film insulated flexible heater.

20. The pouch cell according to claim 1, wherein the pouch cell is a Li-ion pouch cell.

* * * * *